United States Patent
Kim et al.

(10) Patent No.: US 11,736,924 B2
(45) Date of Patent: Aug. 22, 2023

(54) EMERGENCY CALL SERVICE SYSTEM FOR VEHICLE AND METHOD THEREFOR

(71) Applicants: HYUNDAI MOTOR COMPANY, Seoul (KR); KIA Corporation, Seoul (KR)

(72) Inventors: Sun Woo Kim, Seoul (KR); Ha Rin Lee, Gwangmyeong-si (KR); Hee Jun Lee, Seoul (KR); Jae Am Seo, Seongnam-si (KR)

(73) Assignees: HYUNDAI MOTOR COMPANY, Seoul (KR); KIA Corporation, Seoul (KR)

(*) Notice: Subject to any disclaimer, the term of this patent is extended or adjusted under 35 U.S.C. 154(b) by 10 days.

(21) Appl. No.: 17/331,193

(22) Filed: May 26, 2021

(65) Prior Publication Data

US 2022/0150681 A1  May 12, 2022

(30) Foreign Application Priority Data

Nov. 10, 2020  (KR) .................... 10-2020-0149548

(51) Int. Cl.
*H04W 4/90* (2018.01)
*H04W 4/40* (2018.01)
*G07C 5/00* (2006.01)

(52) U.S. Cl.
CPC .............. *H04W 4/90* (2018.02); *G07C 5/008* (2013.01); *H04W 4/40* (2018.02)

(58) Field of Classification Search
CPC ...................................................... H04W 4/90
USPC ...................................................... 455/404.1
See application file for complete search history.

(56) References Cited

U.S. PATENT DOCUMENTS

| 2016/0029193 A1* | 1/2016 | Iwai ......................... H04W 4/06 455/404.1 |
| 2016/0087655 A1* | 3/2016 | Kim ....................... H04W 4/029 455/404.1 |
| 2020/0126325 A1* | 4/2020 | Jeon ..................... G07C 5/0866 |

* cited by examiner

*Primary Examiner* — Qutbuddin Ghulamali
(74) *Attorney, Agent, or Firm* — Morgan, Lewis & Bockius LLP

(57) ABSTRACT

An emergency call service system for a vehicle and a method therefor are provided. The emergency call service system includes a vehicle terminal configured to collect vehicle data during driving and a server configured to determine whether an accident occurs in a vehicle based on the vehicle data and to request rescue from an emergency call center, when it is determined that the accident occurs in the vehicle.

17 Claims, 6 Drawing Sheets

EMERGENCY CALL SERVICE SYSTEM FOR VEHICLE AND METHOD THEREFOR

CROSS-REFERENCE TO RELATED APPLICATION

This application claims the priority to and the benefit of Korean Patent Application No. 10-2020-0149548, filed on Nov. 10, 2020, the entire contents of which are incorporated herein by reference.

TECHNICAL FIELD

The present disclosure relates to technologies of determining whether an accident occurs in a vehicle based on vehicle data and requesting rescue from an emergency call center when the accident occurs.

BACKGROUND

In general, an emergency call service system is a system which helps a vehicle proactively transmit accident situations to a center, when an accident occurs in the vehicle, to perform quick follow-up measures. Because the vehicle determines the accident immediately when the accident occurs to notify users of it, situations may be faster delivered. Coping with accident is possible in a state where it is unable for a driver to directly notify an accident situation due to serious accidents.

An emergency call module provided in the vehicle determines whether an accident occurs in the vehicle based on an airbag deployment signal from an airbag system and delivers an accident situation to an emergency call center when the accident occurs in the vehicle.

When considering that the accident situation which needs an emergency call is an accident situation of a serious level where airbag deployment and driver injury are expected and is necessarily accompanied by serious damage of the vehicle body, it may be impossible for such an emergency call module to perform a normal operation due to damage to the vehicle electronic system or damage to the modem.

Furthermore, because the emergency call module recognizes an accident situation based on whether airbag deployment is performed, it is impossible for the emergency call module to perform a normal operation, when an accident situation which is not matched to airbag module badness or an airbag deployment condition occurs.

Thus, supplementing a physical limit of the emergency call module, by accident situation recognition assist logic which uses collected vehicle data, may be desirable.

Details described in the background art are written to increase the understanding of the background of the present disclosure, which may include details rather than an existing technology well known to those skilled in the art.

SUMMARY

An aspect of the present disclosure provides an emergency call service system for a vehicle for collecting various vehicle data during driving at the vehicle terminal to transmit the collected vehicle data to the cloud server, determining whether an accident occurs in the vehicle based on the vehicle data received from the vehicle terminal at the cloud server, and requesting rescue from an emergency call center, when it is determined that the accident occurs in the vehicle, to provide the driver of the vehicle with an emergency call service in a situation where it is impossible for the vehicle terminal to provide a notification of the accident fact due to the accident and a method therefor.

The technical problems to be solved by the present disclosure are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

According to an aspect of the present disclosure, an emergency call service system for a vehicle may include a vehicle terminal that collects vehicle data during driving and a server that determines whether an accident occurs in a vehicle based on vehicle data received from the vehicle terminal and requests rescue from an emergency call center, when it is determined that the accident occurs in the vehicle.

In one form of the present disclosure, the vehicle terminal may collect at least one of location data, speed data, angular acceleration data, or an airbag deployment signal of the vehicle.

In one form of the present disclosure, the vehicle terminal may transmit the highest angular acceleration data and the last received vehicle speed data to the server within a current sampling period.

In one form of the present disclosure, the vehicle terminal may store the first received vehicle speed data in a buffer, sequentially may update the vehicle speed data to vehicle speed data subsequently received, and may transmit the vehicle speed data stored in the buffer to the server at a time when the current sampling period ends.

In one form of the present disclosure, the vehicle terminal may store the first received angular acceleration data in a buffer, may sequentially compare the angular acceleration data with angular acceleration data subsequently received to store angular acceleration data having a higher value in the buffer, and may transmit the angular acceleration data stored in the buffer to the server at a time when the current sampling period ends.

In one form of the present disclosure, the vehicle terminal may transmit the vehicle data at a first reference period $\alpha$, when a speed of the vehicle is included in a first interval A, may transmit the vehicle data at a second reference period $\beta$, when the speed of the vehicle is included in a second interval B, and may transmit the vehicle data at a third reference period $\gamma$ ($\alpha<\beta<\gamma$), when the speed of the vehicle is included in a third interval C (A>B>C).

In one form of the present disclosure, the vehicle terminal may maintain the first reference period during a first reference time T1, when the speed of the vehicle changes from the first interval to the second interval, and may maintain the second reference period during a second reference time T2 (T1>T2), when the speed of the vehicle changes from the second interval to the third interval.

In one form of the present disclosure, the vehicle terminal may notify the server that the vehicle is parking, when the vehicle is parking.

In one form of the present disclosure, the server may determine that the accident occurs in the vehicle, when the vehicle data is not received within a transmission time corresponding to a speed of the vehicle, in a state where the vehicle is traveling.

In one form of the present disclosure, the server may attempt to communicate with the vehicle terminal, when the vehicle data is not received within a transmission time corresponding to a speed of the vehicle, in a state where the vehicle is traveling, and may determine that the accident occurs in the vehicle, when the vehicle terminal is not connected or when there is no response from the vehicle terminal.

In one form of the present disclosure, the server may determine that the accident occurs in the vehicle, when a rate of change in speed of the vehicle is greater than a first threshold and when angular acceleration is greater than a second threshold.

In one form of the present disclosure, the server may attempt to communicate with the vehicle terminal, when a rate of change in speed of the vehicle is greater than a first threshold and when angular acceleration is greater than a second threshold, and may determine that the accident occurs in the vehicle, when the vehicle terminal is not connected or when there is no response from the vehicle terminal.

According to another aspect of the present disclosure, an emergency call service method for a vehicle may include collecting, by a vehicle terminal, vehicle data during driving, transmitting, by the vehicle terminal, the collected vehicle data to a server, determining, by a server, whether an accident occurs in a vehicle based on the received vehicle data, and requesting, by the server, rescue from an emergency call center, when it is determined that the accident occurs in the vehicle.

In one form of the present disclosure, the transmitting of the vehicle data to the server may include transmitting the highest angular acceleration data and the last received vehicle speed data to the server within a current sampling period.

In one form of the present disclosure, the transmitting of the vehicle data to the server may include storing the first received vehicle data in a buffer, sequentially updating the vehicle speed data to vehicle speed data subsequently received, and transmitting the vehicle speed data stored in the buffer to the server at a time when the current sampling period ends.

In one form of the present disclosure, the transmitting of the vehicle data to the server may include storing the first received angular acceleration data in a buffer, sequentially comparing the angular acceleration data with angular acceleration data subsequently received and storing angular acceleration data having a higher value in the buffer, and transmitting the angular acceleration data stored in the buffer to the server at a time when the current sampling period ends.

In one form of the present disclosure, the transmitting of the vehicle data to the server may include transmitting the vehicle data at a first reference period α, when a speed of the vehicle is included in a first interval A, transmitting the vehicle data at a second reference period β, when the speed of the vehicle is included in a second interval B, and transmitting the vehicle data at a third reference period γ (α<β<γ), when the speed of the vehicle is included in a third interval C (A>B>C).

In one form of the present disclosure, the transmitting of the vehicle data to the server may further include maintaining the first reference period during a first reference time T1, when the speed of the vehicle changes from the first interval to the second interval and maintaining the second reference period during a second reference time T2 (T1>T2), when the speed of the vehicle changes from the second interval to the third interval.

In one form of the present disclosure, the determining of whether the accident occurs in the vehicle may include attempting to communicate with the vehicle terminal, when the vehicle data is not received within a transmission time corresponding to a speed of the vehicle, in a state where the vehicle is traveling and determining that the accident occurs in the vehicle, when the vehicle terminal is not connected or when there is no response from the vehicle terminal.

In one form of the present disclosure, the determining of whether the accident occurs in the vehicle may include attempting to communicate with the vehicle terminal, when a rate of change in speed of the vehicle is greater than a first threshold and when angular acceleration is greater than a second threshold and determining that the accident occurs in the vehicle, when the vehicle terminal is not connected or when there is no response from the vehicle terminal.

DRAWINGS

The above and other objects, features and advantages of the present disclosure will be more apparent from the following detailed description taken in conjunction with the accompanying drawings.

DETAILED DESCRIPTION

Figure 1:
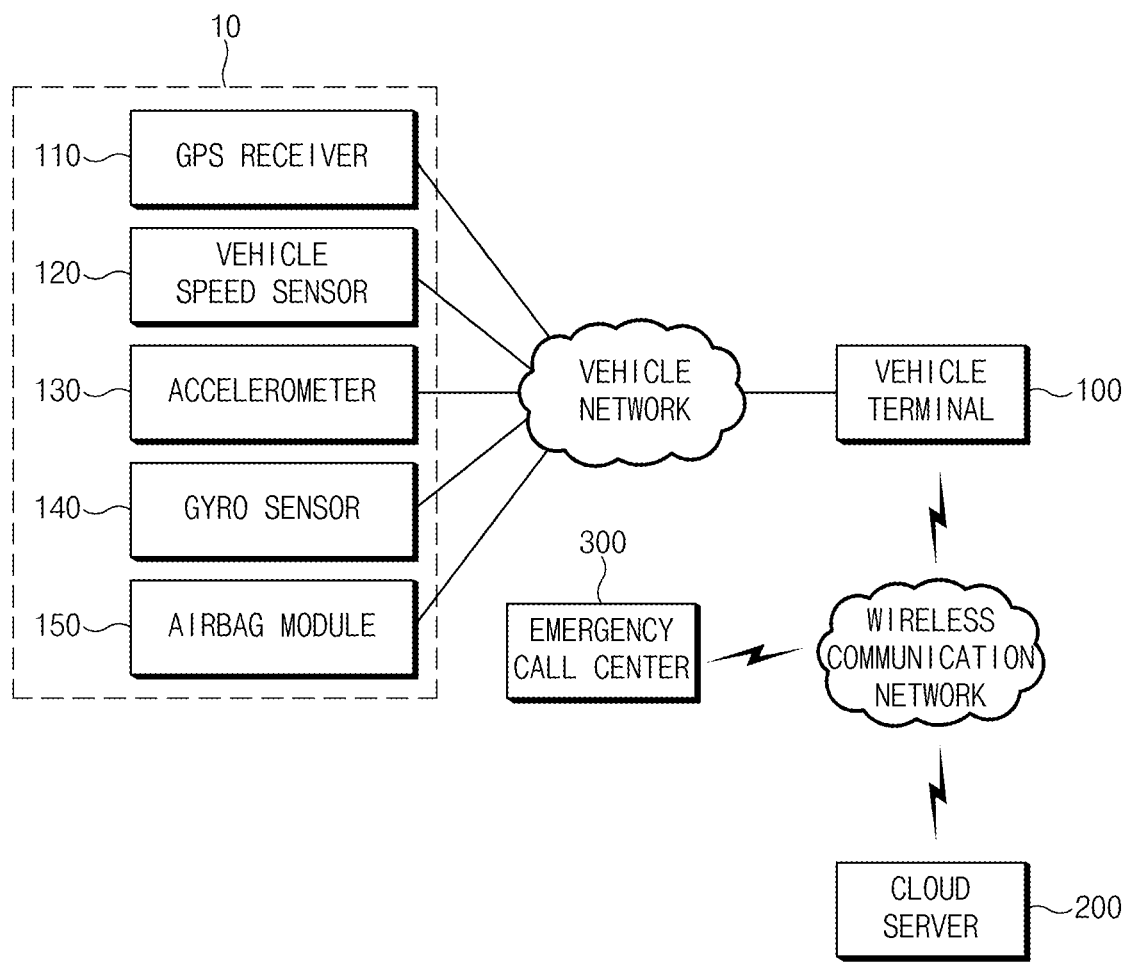
FIG. 1 is a block diagram illustrating a configuration of an emergency call service system for a vehicle in some forms of the present disclosure.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the teams do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an emergency call service system for a vehicle in some forms of the present disclosure.

As shown in FIG. 1, the emergency call service system for the vehicle in some forms of the present disclosure may include a vehicle terminal 100 and a cloud server 200.

The vehicle terminal 100 may include a telematics terminal and may collect various vehicle data (or information) used to determine whether an accident occurs in the vehicle from various devices 10 provided in the vehicle during driving. For example, the vehicle terminal 100 may collect location data of the vehicle as vehicle data from a global positioning system (GPS) receiver 110, may collect speed data of the vehicle as vehicle data from a vehicle speed sensor 120, may collect acceleration data of the vehicle as vehicle data from an accelerometer 130, may collect longitudinal acceleration data, lateral acceleration data, and angular acceleration data of the vehicle as vehicle data from a gyro sensor 140, and may collect an airbag deployment signal (information) as vehicle data from an airbag module 150. In this case, angular acceleration indicates an hourly rate of change in yaw value.

A period when the accelerometer 130 transmits acceleration data to the vehicle terminal 100 and a period when the gyro sensor 140 transmits gyro data (longitudinal acceleration data, lateral acceleration data, or angular acceleration data) to the vehicle terminal 100 may be faster than a period when the vehicle terminal 100 transmits vehicle data to the cloud server 200. Thus, the vehicle terminal 100 may sample acceleration data transmitted from the accelerometer 130 and gyro data transmitted from the gyro sensor 140 in response to a period (hereinafter referred to as "reference period") when the vehicle terminal 100 transmits vehicle data to the cloud server 200.

For example, the vehicle terminal 100 may select data indicating the largest value within a sampling period with respect to acceleration data and gyro data, may select the last received data within the sampling period with respect to vehicle speed data and GPS location data, and may select an airbag deployment signal, when the airbag deployment signal is received at least once within the sampling period with respect to the airbag deployment signal.

The vehicle terminal 100 may obtain sampling data based on a buffer.

For example, the vehicle terminal 100 may store vehicle speed data received from the vehicle speed sensor 120 in the buffer, may sequentially update the vehicle speed data to vehicle speed data subsequently received, and may select the vehicle speed data (the last stored vehicle speed within a current sampling period) stored in the buffer at a time when the current sampling period ends (immediately before a next sampling period starts).

For another example, the vehicle terminal 100 may store GPS location data received from the GPS receiver 110 in the buffer, may sequentially update the GPS location data to GPS location data subsequently received, and may select the GPS location data (the last stored location within a current sampling period) stored in the buffer at a time when the current sampling period ends (immediately before a next sampling period starts).

For another example, the vehicle terminal 100 may store acceleration data received from the accelerometer 130 in the buffer, may sequentially compare the acceleration data with acceleration data subsequently received to store acceleration data having a higher value (acceleration) in the buffer, and may select the acceleration data (the highest acceleration within a current sampling period) stored in the buffer at a time when the current sampling period ends (immediately before a next sampling period starts). In this case, because each of the acceleration data is a real number, the acceleration data are compared with each other using their absolute values. Thereafter, when the sampling of the acceleration data is completed at the current sampling period, the vehicle terminal 100 may reset the buffer.

For another example, the vehicle terminal 100 may store gyro data received from the gyro sensor 140 in the buffer, may sequentially compare the gyro data with gyro data received subsequently to store gyro data having a larger value in the buffer, and may select the gyro data (the largest value within a current sampling period) stored in the buffer at a time when the current sampling period ends (immediately before a next sampling period starts). In this case, because each of the gyro data is a real number, the gyro data are compared with each other using their absolute values. Thereafter, when the sampling of the gyro data is completed at the current sampling period, the vehicle terminal 100 may reset the buffer. Such sampling of the gyro data may be performed for each of longitudinal acceleration data, lateral acceleration data, and angular acceleration data.

The vehicle terminal 100 may determine a reference period and a sampling period based on a vehicle speed. For example, the vehicle terminal 100 may set the reference period to 1 second in an interval (hereinafter referred to as "first interval") where the vehicle speed is greater than 50 kph (a speed where it is expected that the vehicle will be seriously damaged upon accident), may set the reference period to 5 seconds in an interval (hereinafter referred to as "second interval") where the vehicle speed is less than or equal to 50 kph and is greater than 15 kph (a speed where it is expected that the vehicle will be slightly damaged upon accident), and may set the reference period to 10 seconds in an interval (hereinafter referred to as "third interval") where the vehicle speed is less than or equal to 15 kph.

The vehicle terminal 100 may manage hysteresis to prevent the reference period from being frequently changed in a boundary value of the vehicle speed interval. In other words, the vehicle terminal 100 may immediately apply a corresponding reference period, when changing from an interval with a low vehicle speed to an interval with a high vehicle speed, but may maintain a previous reference period during a reference time, when changing from an interval with a high vehicle speed to an interval with a low vehicle speed. In this case, the reference time when the first interval changes to the second interval may be, for example, 10 seconds, and the reference time when the second interval changes to the third interval may be, for example, 5 seconds.

The vehicle terminal 100 may transmit various vehicle data collected during driving to the cloud server 200.

When the vehicle is parking, the vehicle terminal 100 may notify the cloud server 200 that the vehicle is parking to recognize a situation where the vehicle terminal 100 does not transmit vehicle data (a normal situation rather than an accident). In this case, the parking state of the vehicle refers to an engine stop state, when the vehicle is an internal combustion engine vehicle, and refers to a state where it is not prepared to drive, when the vehicle is an electric vehicle.

Meanwhile, the cloud server 200 may determine whether an accident occurs in the vehicle based on vehicle data received from the vehicle terminal 100 and may request rescue from the emergency call center 300, when it is determined that the accident occurs in the vehicle.

For example, when an airbag deployment signal is received from the vehicle terminal 100, the cloud server 200 may determine that an accident occurs in the vehicle.

For another example, when a rate of change in vehicle speed is greater than a first threshold and when an angular acceleration is greater than a second threshold, the cloud server 200 may determine that an accident occurs in the vehicle.

Furthermore, when vehicle data is not received in a state where the vehicle is traveling, the cloud server 200 may determine that an accident occurs in the vehicle. Hereinafter, a description will be given of a process of determining whether an accident occurs in the vehicle in the cloud server 200, when vehicle data is not received, with reference to FIG. 2. In this case, the cloud server 200 may have a timer function.

Figure 2:
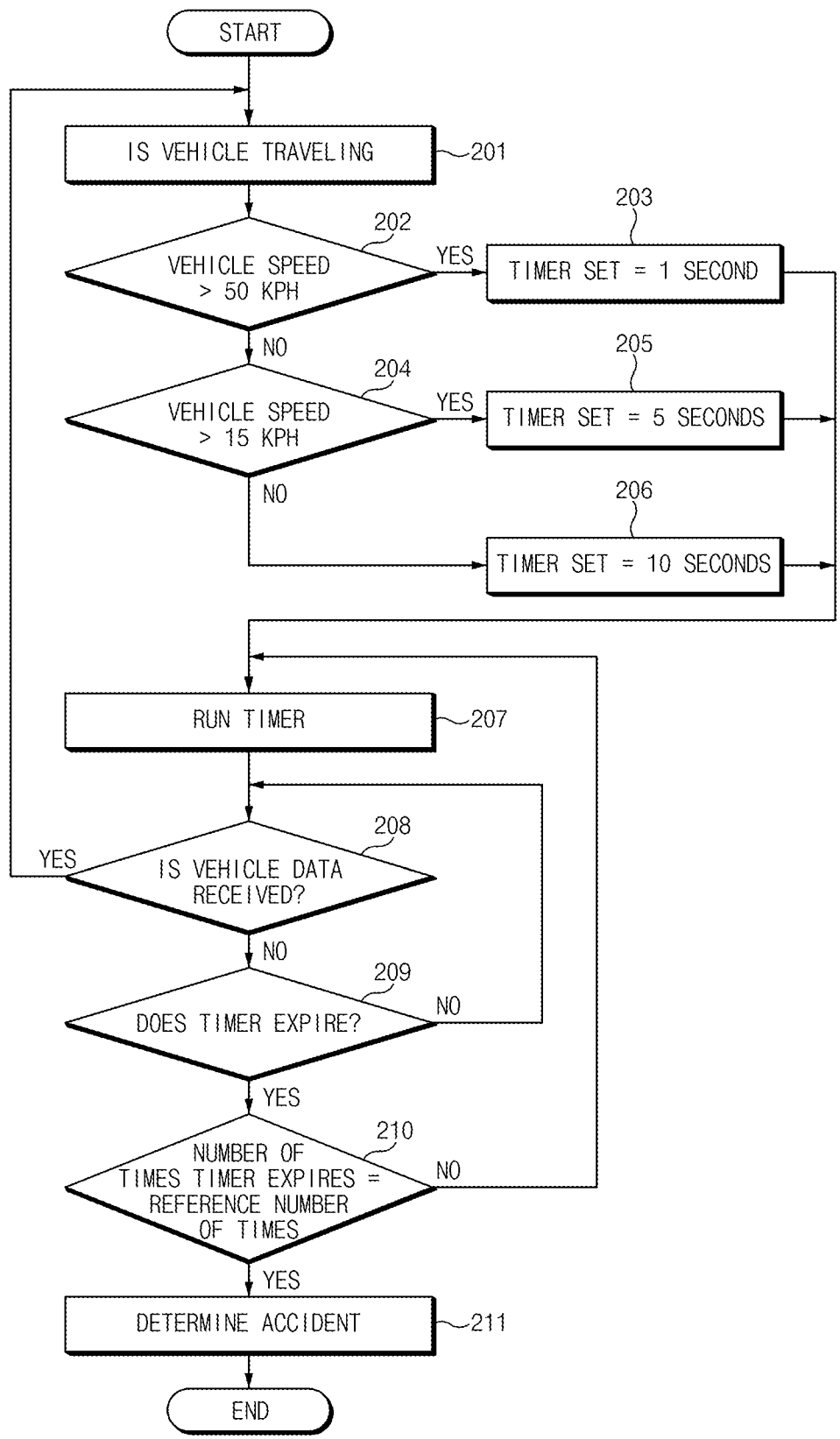
FIG. 2 is a flowchart illustrating a process of determining whether an accident occurs in a vehicle in a cloud server in an emergency call service system for a vehicle in some forms of the present disclosure.

FIG. 2 is a flowchart illustrating a process of determining whether an accident occurs in a vehicle in a cloud server in an emergency call service system for a vehicle in some forms of the present disclosure.

First of all, in a state where the vehicle is traveling in operation 201, in operation 202, a cloud server 200 of FIG. 1 may determine whether the vehicle speed is greater than 50 kph.

When the vehicle speed is greater than 50 kph as a result of the determination in operation 202, in operation 203, the cloud server 200 may set the timer to 1 second.

When the vehicle speed is not greater than 50 kph as a result of the determination in operation 202, in operation 204, the cloud server 200 may determine whether the vehicle speed is greater than 15 kph.

When the vehicle speed is greater than 15 kph as a result of the determination in operation 204, in operation 205, the cloud server 200 may set the timer to 5 seconds. When the vehicle speed is not greater than 15 kph as a result of the determination in operation 204, in operation 206, the cloud server 200 may set the timer to 10 seconds.

In operation 207, the cloud server 200 may run the timer.

In operation 208, the cloud server 200 may determine whether vehicle data is received from a vehicle terminal 100 of FIG. 1. When the vehicle data is received, the cloud server 200 may proceed to operation 201. When the vehicle data is not received, in operation 209, the cloud server 200 may monitor whether the timer expires.

When the timer does not expire as a result of the monitoring in operation 209, the cloud server 200 may proceed to operation 208. When the timer expires as a result of the monitoring in operation 209, in operation 210, the cloud server 200 may determine whether the number of times the timer expires is the same as a reference number of times (e.g., 3 times).

When the number of times the timer expires is not the same as the reference number of times as a result of the determination in operation 210, the cloud server 200 may proceed to operation 207. When the number of times the timer expires is the same as the reference number of times as a result of the determination in operation 210, in operation 211, the cloud server 200 may determine that an accident occurs in the vehicle. In this case, although the number of times the timer expires is the same as the reference number of times (e.g., 3 times), the cloud server 200 may not immediately determine that an accident occurs in the vehicle, and may attempt to communicate with the vehicle terminal 100 and may finally determine that an accident occurs in the vehicle, when the vehicle terminal 100 is not connected or when there is no response of the driver from the vehicle terminal 100.

Figure 3:
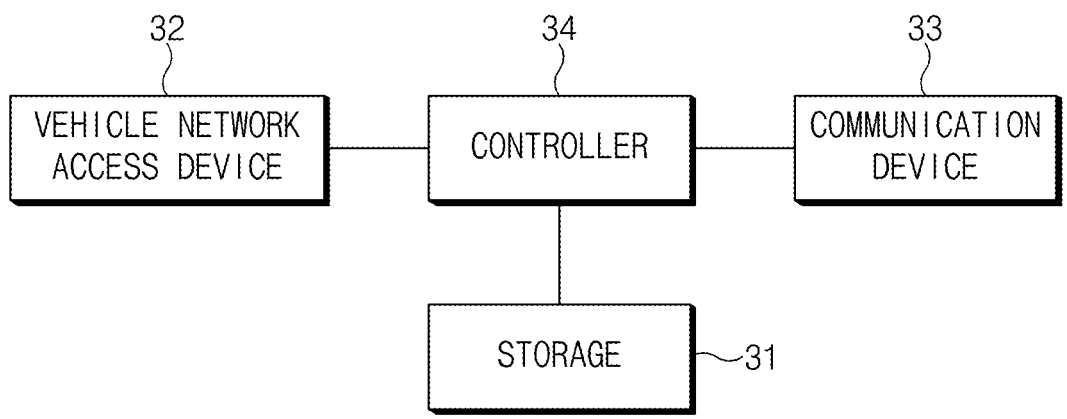
FIG. 3 is a block diagram illustrating a detailed configuration of a vehicle terminal in an emergency call service system for a vehicle in some forms of the present disclosure.

FIG. 3 is a block diagram illustrating a detailed configuration of a vehicle terminal in an emergency call service system for a vehicle in some forms of the present disclosure.

As shown in FIG. 3, a vehicle terminal 100 in the emergency call service system for the vehicle in some foams of the present disclosure may include a storage 31, a vehicle network access device 32, a communication device 33, and a controller 34. In this case, the respective components may be combined into one component and some components may be omitted, depending on a manner which executes the vehicle terminal 100 in the emergency call service system for the vehicle in some forms of the present disclosure.

Seeing the respective components, first of all, the storage 31 may store various logics, algorithms, and programs required in a process of collecting various vehicle data from various devices 10 provided in the vehicle during driving and transmitting the collected vehicle data to a cloud server 200.

A partial area of the storage 31 may be used as a buffer and may store various vehicle data.

The storage 31 may store a reference period, a reference time, and a sampling period corresponding to a vehicle speed.

The storage 31 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The vehicle network access device 32 may provide an interface with a vehicle network. In this case, the vehicle network may include a controller area network (CAN), a controller area network with flexible data-rate (CAN FD), a local interconnect network (LIN), FlexRay, media oriented systems transport (MOST), an Ethernet, or the like.

The communication device 33 may be a module which provides a communication interface with the cloud server 200, which may include a mobile communication module and a wireless Internet module.

The mobile communication module may communicate with the cloud server 200 over a mobile communication network established according to technical standards for mobile communication or a communication scheme (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like).

The wireless Internet module may be a module for wireless Internet access, which may communicate with the cloud server 200 through wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like.

The controller 34 may perform the overall control such that respective components may normally perform their own functions. Such a controller 34 may be implemented in the form of hardware, may be implemented in the form of software, or may be implemented in the form of a combination thereof. Preferably, the controller 34 may be implemented as, but not limited to, a microprocessor.

Particularly, the controller 34 may perform a variety of control in a process of collecting various vehicle data from various devices 10 provided in the vehicle during driving and transmitting the collected vehicle data to the cloud server 200.

The controller 34 may collect various vehicle data (or information) used to determine whether an accident occurs in the vehicle from various devices 10 provided in the vehicle during driving. For example, the controller 34 may collect location data of the vehicle as vehicle data from a GPS receiver 110 of FIG. 1, may collect speed data of the vehicle as vehicle data from a vehicle speed sensor 120 of FIG. 1, may collect acceleration data of the vehicle as vehicle data from an accelerometer 130 of FIG. 1, may collect longitudinal acceleration data, lateral acceleration data, and angular acceleration data of the vehicle as vehicle data from a gyro sensor 140 of FIG. 1, and may collect an airbag deployment signal (information) as vehicle data from an airbag module 150 of FIG. 1.

The controller 34 may sample acceleration data transmitted from the accelerometer 130 and gyro data transmitted from the gyro sensor 140 in response to a reference period.

The controller 34 may obtain sampling data based on a buffer.

The controller 34 may determine a reference period and a sampling period based on a vehicle speed.

The controller 34 may manage hysteresis to prevent the reference period from being frequently changed in a boundary value of the vehicle speed interval. In other words, the controller 34 may immediately apply a corresponding reference period, when changing from an interval with a low vehicle speed to an interval with a high vehicle speed, but may maintain a previous reference period during a reference time, when changing from an interval with a high vehicle speed to an interval with a low vehicle speed.

The controller 34 may transmit various vehicle data collected during driving to the cloud server 200 via the communication device 33.

The controller 34 may notify the cloud server 200 that the vehicle is parking via the communication device 33 to recognize a situation where the controller 34 does not transmit vehicle data (a normal situation rather than an accident).

Figure 4:
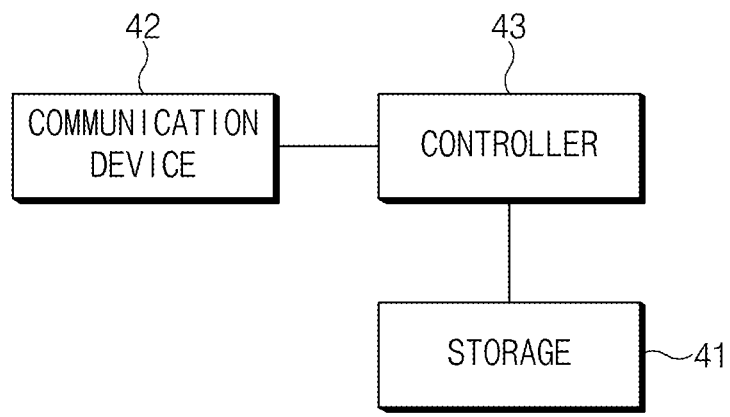
FIG. 4 is a block diagram illustrating a detailed configuration of a cloud server in an emergency call service system for a vehicle in some forms of the present disclosure.

FIG. 4 is a block diagram illustrating a detailed configuration of a cloud server in an emergency call service system for a vehicle in some forms of the present disclosure.

As shown in FIG. 4, a cloud server 200 in the emergency call service system for the vehicle according to an form of the present disclosure may include a storage 41, a communication device 42, and a controller 43. In this case, the respective components may be combined into one component and some components may be omitted, depending on a manner which executes the cloud server 200 in the emergency call service system for the vehicle in some forms of the present disclosure.

Seeing the respective components, first of all, the storage 41 may store various logics, algorithms, and programs required in a process of determining whether an accident occurs in the vehicle based on vehicle data received from a vehicle terminal 100 of FIG. 1 and requesting rescue from an emergency call center 300 of FIG. 1, when it is determined that the accident occurs in the vehicle.

The communication device 42 may provide a communication interface with the vehicle terminal 100.

When an airbag deployment signal is received from the vehicle terminal 100, the controller 43 may determine that an accident occurs in the vehicle.

When a rate of change in vehicle speed is greater than a first threshold and when an angular acceleration is greater than a second threshold, the controller 43 may determine that an accident occurs in the vehicle.

When vehicle data is not received in a state where the vehicle is traveling, the controller 43 may determine that an accident occurs in the vehicle.

Figure 5:
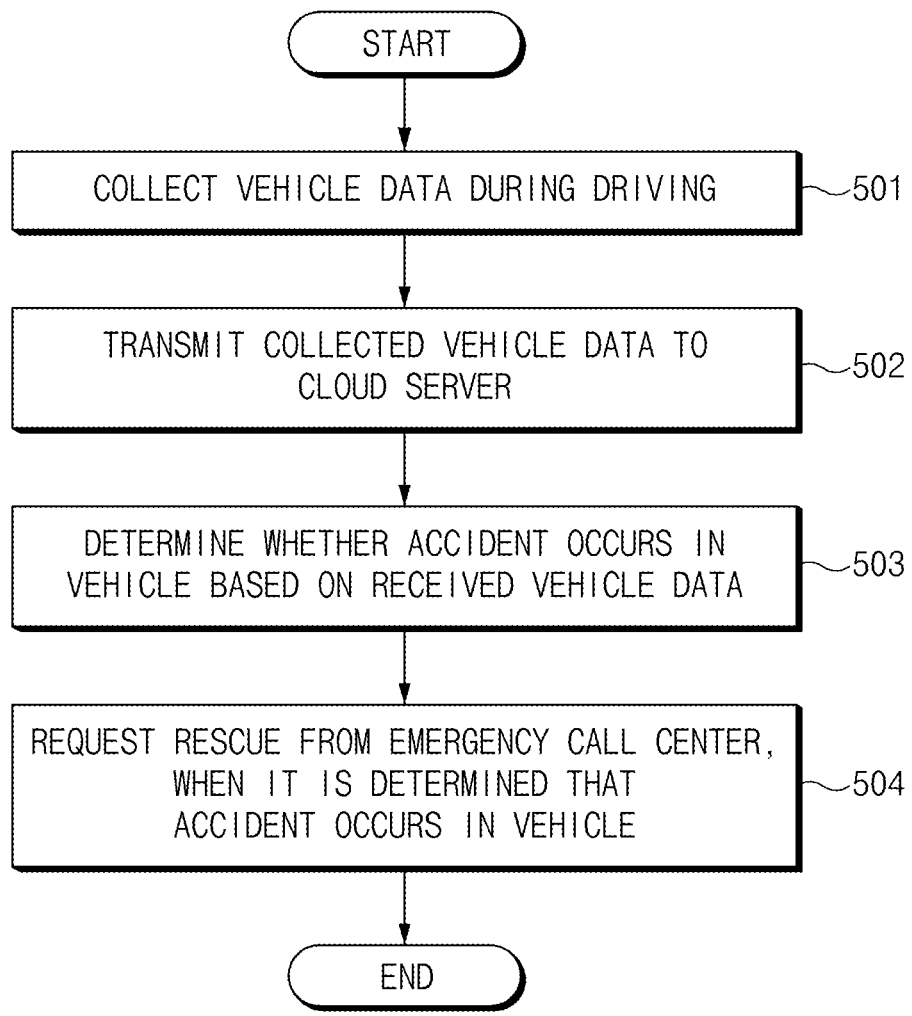
FIG. 5 is a flowchart illustrating an emergency call service method for a vehicle in some forms of the present disclosure.

FIG. 5 is a flowchart illustrating an emergency call service method for a vehicle in some forms of the present disclosure.

First of all, in operation 501, a vehicle terminal 100 of FIG. 1 may collect vehicle data during driving.

In operation 502, the vehicle terminal 100 may transmit the collected vehicle data to a cloud server 200 of FIG. 1.

In operation 503, the cloud server 200 may determine whether an accident occurs in the vehicle based on the received vehicle data.

When it is determined that the accident occurs in the vehicle, in operation 504, the cloud server 200 may request rescue from an emergency call center 300 of FIG. 1.

Figure 6:
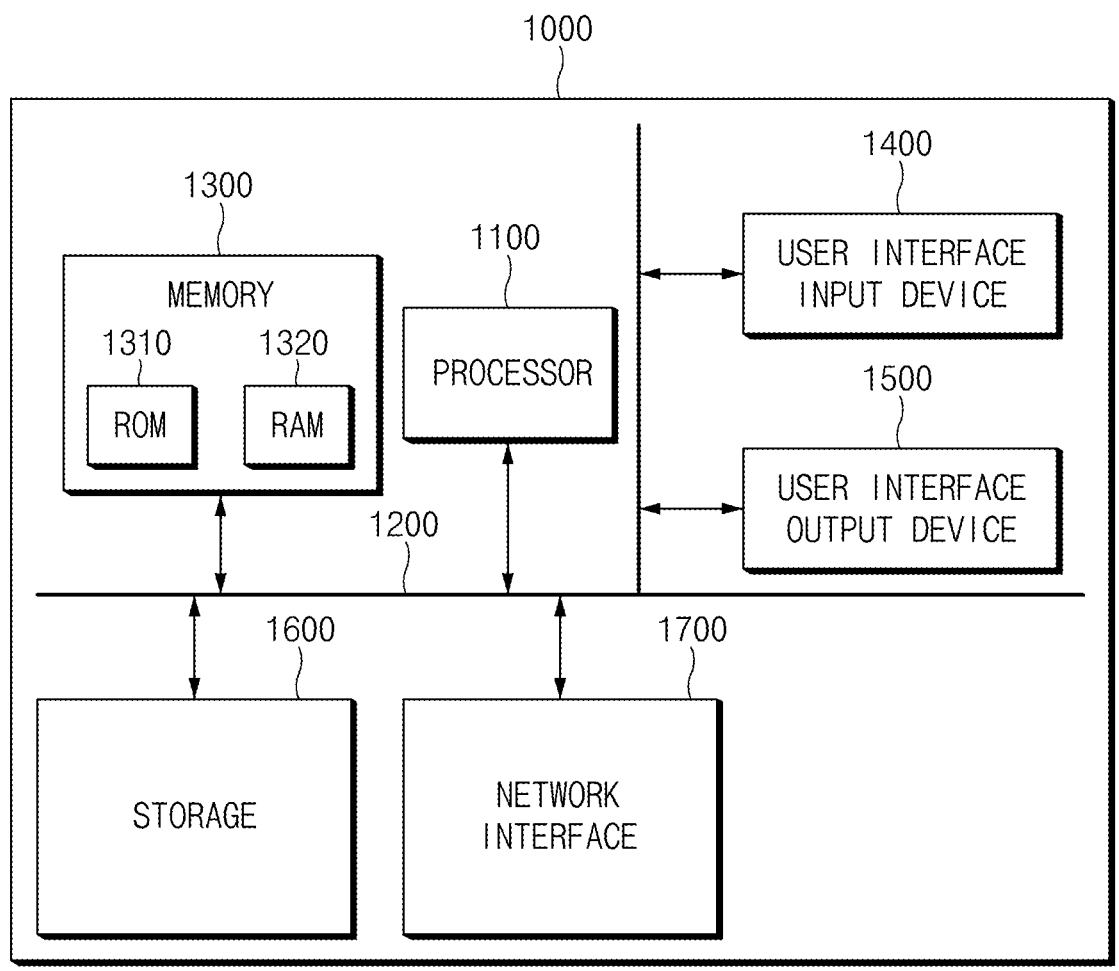
FIG. 6 is a block diagram illustrating a computing system for executing an emergency call service method for a vehicle in some forms of the present disclosure.

FIG. 6 is a block diagram illustrating a computing system for executing an emergency call service method for a vehicle in some forms of the present disclosure.

Referring to FIG. 6, the above-mentioned emergency call service method for the vehicle in some forms of the present disclosure may be implemented by means of the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The emergency call service system for the vehicle and the method therefor in some forms of the present disclosure are provided to collect various vehicle data during driving at the vehicle terminal to transmit the collected vehicle data to the cloud server, determine whether an accident occurs in the vehicle based on the vehicle data received from the vehicle terminal at the cloud server, and request rescue from an emergency call center, when it is determined that the accident occurs in the vehicle, thus providing the driver of the vehicle with an emergency call service in a situation where it is impossible for the vehicle terminal to provide a notification of the accident fact due to the accident.

Hereinabove, although the present disclosure has been described with reference to exemplary forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms of the present disclosure. The scope of the present disclosure should be construed on the basis of the accompanying claims, and all the technical ideas within the scope equivalent to the claims should be included in the scope of the present disclosure.

What is claimed is:

1. An emergency call service system for a vehicle, the emergency call service system comprising:
    a vehicle terminal configured to collect vehicle data during driving of the vehicle; and
    a server configured to:
        determine whether an accident occurs in the vehicle based on the vehicle data; and
        request rescue from an emergency call center when it is determined that the accident occurs in the vehicle,
    wherein the vehicle terminal is configured to:
        collect at least one of location data, speed data, angular acceleration data, or an airbag deployment signal of the vehicle, and
        transmit the angular acceleration data having a highest value, the speed data and the air deployment signal of the vehicle to the server within a current sampling period.

2. The emergency call service system of claim 1, wherein the vehicle terminal is configured to:
    store first received speed data in a buffer;
    sequentially update the speed data; and
    transmit the stored speed data to the server when the current sampling period ends.

3. The emergency call service system of claim 1, wherein the vehicle terminal is configured to:
    store first received angular acceleration data in a buffer;
    sequentially compare the angular acceleration data to store angular acceleration data having a higher value in the buffer; and
    transmit the stored angular acceleration data to the server when the current sampling period ends.

4. The emergency call service system of claim 1, wherein the vehicle terminal is configured to:
    transmit the vehicle data at a first reference period when a vehicle speed is included in a first interval;
    transmit the vehicle data at a second reference period that is greater than the first reference period when the vehicle speed is included in a second interval that is shorter than the first interval; and
    transmit the vehicle data at a third reference period that is greater than the first reference period and the second reference period when the vehicle speed is included in a third interval that is shorter than the first interval and the second interval.

5. The emergency call service system of claim 4, wherein the vehicle terminal is configured to:
    maintain the first reference period during a first reference time when the vehicle speed changes from the first interval to the second interval; and
    maintain the second reference period during a second reference time that is shorter than the first reference time when the vehicle speed changes from the second interval to the third interval.

6. The emergency call service system of claim 1, wherein the vehicle terminal is configured to:
    notify the server that the vehicle is parking when the vehicle is parking.

7. The emergency call service system of claim 1, wherein the server is configured to:
    determine that the accident occurs in the vehicle when the vehicle data is not received within a transmission time corresponding to a vehicle speed while the vehicle is traveling.

8. The emergency call service system of claim 1, wherein the server is configured to:
    attempt to communicate with the vehicle terminal when the vehicle data is not received within a transmission time corresponding to a vehicle speed while the vehicle is traveling; and
    determine that the accident occurs in the vehicle when the vehicle terminal is not connected or when no response is received from the vehicle terminal.

9. The emergency call service system of claim 1, wherein the server is configured to:
    determine that the accident occurs in the vehicle when a rate of change in the vehicle speed is greater than a first threshold and when an angular acceleration is greater than a second threshold.

10. The emergency call service system of claim 1, wherein the server is configured to:
    attempt to communicate with the vehicle terminal when a rate of change in the vehicle speed is greater than a first threshold and when an angular acceleration is greater than a second threshold; and
    determine that the accident occurs in the vehicle when the vehicle terminal is not connected or when no response is received from the vehicle terminal.

11. An emergency call service method for a vehicle, the emergency call service method comprising:
    collecting, by a vehicle terminal, vehicle data during driving of the vehicle;
    transmitting, by the vehicle terminal, the collected vehicle data to a server;
    determining, by the server, whether an accident occurs in the vehicle based on the vehicle data; and
    when it is determined that the accident occurs in the vehicle, requesting, by the server, rescue from an emergency call center,
    wherein transmitting the vehicle data includes transmitting, to the server, angular acceleration data having a highest value and vehicle speed data within a current sampling period.

12. The emergency call service method of claim 11, wherein transmitting the vehicle data includes:
    storing first received vehicle speed data in a buffer;
    sequentially updating the vehicle speed data; and
    transmitting, to the server, the stored vehicle speed data when the current sampling period ends.

13. The emergency call service method of claim 11, wherein transmitting the vehicle data includes:
    storing first received angular acceleration data in a buffer;
    sequentially comparing the angular acceleration data and storing angular acceleration data having a higher value in the buffer; and
    transmitting, to the server, the stored angular acceleration data when the current sampling period ends.

14. The emergency call service method of claim 11, wherein transmitting the vehicle data includes:
- transmitting the vehicle data at a first reference period when a vehicle speed is included in a first interval;
- transmitting the vehicle data at a second reference period that is longer than the first reference period when the vehicle speed is included in a second interval that is shorter than the first interval; and
- transmitting the vehicle data at a third reference period that is shorter than the first reference period and the second reference period when the vehicle speed is included in a third interval that is shorter than the first interval and the second interval.

15. The emergency call service method of claim 14, wherein transmitting the vehicle data to the server further includes:
- maintaining the first reference period during a first reference time when the vehicle speed changes from the first interval to the second interval; and
- maintaining the second reference period during a second reference time that is shorter than the first reference time when the vehicle speed changes from the second interval to the third interval.

16. The emergency call service method of claim 11, wherein determining whether the accident occurs in the vehicle includes:
- attempting to communicate with the vehicle terminal when the vehicle data is not received within a transmission time corresponding to a vehicle speed while the vehicle is traveling; and
- determining that the accident occurs in the vehicle when the vehicle terminal is not connected or when no response is received from the vehicle terminal.

17. The emergency call service method of claim 11, wherein determining whether the accident occurs in the vehicle includes:
- attempting to communicate with the vehicle terminal when a rate of change in a vehicle speed is greater than a first threshold and when an angular acceleration is greater than a second threshold; and
- determining that the accident occurs in the vehicle when the vehicle terminal is not connected or when no response is received from the vehicle terminal.

\* \* \* \* \*